(12) United States Patent
Gorbatov et al.

(10) Patent No.: US 7,437,003 B1
(45) Date of Patent: Oct. 14, 2008

(54) SYSTEM AND METHOD FOR HANDLING ELECTRONIC INK

(75) Inventors: Boris Gorbatov, Sunnyvale, CA (US); Eugene Livshitz, Moscow (RU); Alexandre Pashintsev, Cupertino, CA (US)

(73) Assignee: EverNote Corp., Sunnyvale, CA (US)

( * ) Notice: Subject to any disclaimer, the term of this patent is extended or adjusted under 35 U.S.C. 154(b) by 680 days.

(21) Appl. No.: 11/013,869

(22) Filed: Dec. 16, 2004

Related U.S. Application Data

(60) Provisional application No. 60/530,358, filed on Dec. 16, 2003.

(51) Int. Cl.
*G06K 9/46* (2006.01)

(52) U.S. Cl. .................. 382/201; 382/232; 382/233

(58) Field of Classification Search .................. 382/201, 382/202, 232, 233, 193, 134, 205, 298; 345/168, 345/173, 660; 715/541, 863; 348/561, 581; 711/117, 217
See application file for complete search history.

(56) References Cited

U.S. PATENT DOCUMENTS 3,832,687 A * 8/1974 Miller et al. ................. 382/193
6,442,578 B1 * 8/2002 Forcier ....................... 715/541

* cited by examiner

*Primary Examiner*—Anh Hong Do
(74) *Attorney, Agent, or Firm*—Blakely, Sokoloff, Taylor & Zafman, LLP

(57) ABSTRACT

A set of source points that represent a stroke input of a user is identified. The set of source points may be refined and/or modified. The set of refined/modified source points may then be stored in memory for decoding and recreation of a stroke representation. Additionally, one or both of refining and modifying the source points may be performed through one or more upsampling processes.

24 Claims, 7 Drawing Sheets

SYSTEM AND METHOD FOR HANDLING ELECTRONIC INK

RELATED APPLICATIONS

The present application claims priority from U.S. Provisional Application No. 60/530,358, entitled METHOD AND APPARATUS FOR COMPRESSION OF ELECTRONIC INK WITH IMPROVED QUALITY OF INK RECONSTRUCTION, filed Dec. 16, 2003. Further, the present application incorporates the above provisional application by reference in its entirety and for all purposes.

TECHNICAL FIELD

The disclosed embodiments relate generally to the field of electronic ink processing. In particular, embodiments of the invention relate to a system and method for encoding and decoding ink.

BACKGROUND

The art of electronic ink processing often involves compression or encoding algorithms for storing and processing data that represents a stroke entered through a pointer or pen device. Compression often involves down-sampling the source trajectory, and then encoding the remaining points using some statistical method. In decompressing the source trajectory, a decoder restores the down-sampled set of source points, then (optionally) does up-sampling to provide a smoother representation of decoded strokes. Systems using this approach are described in U.S. Pat. No. 6,101,280, entitled Method and Apparatus For Compression of Electronic Ink, invented by D. E. Reynolds, issued Aug. 8, 2000, and in PCT International Application WO 94/03853, entitled A Method and Apparatus For Compression of Electronic Ink, invented by J. S. Ostrem and published Feb. 17, 1994

Other schemes exist for processing electronic ink. In one past approach, the source trajectory that is identified as a stroke is modeled as a sequence of segments. To encode or compress, each segment is approximated using an analytical curve from some class (usually Bezier curves), and then the parameters of the segments' analytical representation are statistically encoded. To decompress, decoder restores the parameters of segments, then generates discreet representation of decoded strokes using analytical formulae for each segment. This can be done using an arbitrary sampling rate. A system using this approach is described in U.S. Pat. No. 5,473,742, entitled Method and Apparatus For Representing Image Data Using Polynomial Approximation Method and Iterative Transformation-Reparametrization Technique, invented by V. G. Polyakov et al and issued Dec. 5, 1995.

Systems using the second scheme usually provide better compression ratios and better quality of decompressed ink strokes. However, the modeling algorithms they employ tend to be computationally demanding.

Mobile computers, such as laptop, tablet or palm-sized computers usually have drastic performance constraints on the software they use. Such software should use the least possible number of CPU cycles to conserve battery energy. So it is reasonable to use the first compression scheme above for such platforms. The main drawback of this approach arises when trying to get a high compression ratio. In such cases, there is a need to considerably down-sampling the representation of source strokes. However, in the past, this approach has lead to a poor quality image for the decompressed ink strokes.

DETAILED DESCRIPTION

Figure 1:
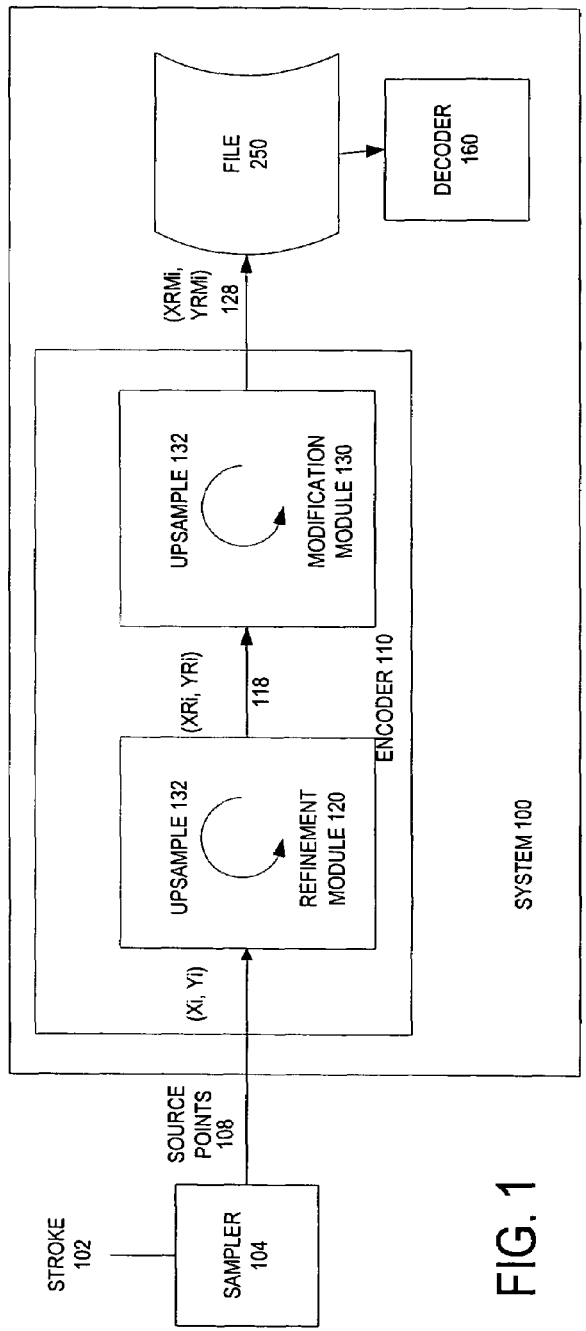
FIG. 1 is a block diagram illustrating a system for handling electronic ink, under an embodiment of the invention.

Embodiments of the invention provide for a technique, system and method for handling electronic ink. A set of source points that represent a stroke input of a user is identified. The set of source points may be refined and/or modified. The set of refined/modified source points may then be stored in memory for decoding and recreation of a stroke representation. As will be described, far fewer amount of data is needed to be stored in order to recreate strokes as represented originally from source points.

Overview

In refining the points in the original set of source points, an embodiment provides that a representation is determined using the original set of source points with one or more of the source points being removed. A comparison is then made between the representation of the original set of source points and the representation generated when one or more of the source points are removed. If the comparison is within a designated threshold, removal of the source point is not reversed. When this step is repeated iteratively for each point in the original set, several points in that set may be removed. The remainder of the original set is termed a refined set.

In addition to refinement, an embodiment provides that one or more points in the original set of source points may be modified. The modification may be a change in a position of the original source point. In one embodiment, points in the refined step are modified. When refinement and execution are both executed, the result is the creation of a set of refined and modified source points. This set may be stored for subsequent decoding.

According to embodiments, one or both of the processes for refining and modifying the source points may be performed through upsampling. For refinement, an upsampling process may be performed to determine which source points should be removed from the original set. For modification, an upsampling process may identify changed positions of one or more points. In either case, upsampling refers to a process where points are added to an existing curve (as formed, for example, from a set of source points).

Among other advantages, refinement allows for a significant reduction in the amount of data that is stored for purpose of recreating a stroke. The less data stored, the less the strain on the memory, processing and power resources of a device. Furthermore, modification enables a significantly better representation of the stroke formed by the original source points. One end result is that fewer points are needed to recreate a good representation of a curve formed from the original set of source points.

One or more embodiments described herein may be implemented using modules. A module may include a program, a subroutine, a portion of a program, a software component or a hardware component capable of performing a stated task or function. As used herein, a module can exist on a hardware component such as a computer system independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System Description

FIG. 1 illustrates a system for handling electronic ink data, according to an embodiment. A system 100 includes an encoder 110, a storage medium 150, and a decoder 160. Ink data may be generated by users who operate devices and/or applications that handle and record trajectory input, such as input entered through use of a mouse, mouse-pen, or other pointer device. A stroke may be entered through, for example, writing tablet connected to a computer as an accessory device, or through the use of a contact-sensitive display (such as provided on tablet computers and personal digital assistants).

A sampler 104 may function in coordination with system 100 to detect a stroke input 101 from a user. The stroke input 101 may correspond to data generated from sampling the trajectory of a pointing device or mechanism operated by a user between a "pen-up" and a "pen-down" action. The sampler 104 samples the movement of the device or mechanism at specific intervals. For example, a typical sampling rate corresponds to 40 measurements per second. The sampler 104 generates source points 108 (Xi,Yi), which are coordinates of the pointer device or mechanism at specific instances when sampling occurs. Thus, the original source points 108 are measured data.

The encoder 110 of system 100 receives the source points 108 and encodes the data for storage. In an embodiment, the encoder 110 implements processes that both (i) reduce the amount of data stored and (ii) modify the stored data to enable improvement of a subsequent decoding process where the sampled stroke is recreated.

In one embodiment, encoder 110 includes a refinement module 120 in which source points 108 are filtered or otherwise refined. A set of refined points 118 (XRi, YRi) results from the refinement process. Depending on the sampling rate and the shape of the stroke, the population of the refined points 118 may be significantly less than the population of the source points 108 (e.g. 3-5 times less). However, as a result of modifications and other processes and operations described herein, even the set of refined points 118 can be modified and combined with other processes in order to produce an improved representation of the stroke, as represented from the sampled source points 108. A method for implementing a refinement module 120 for use with an embodiment of the invention is provided with FIG. 4A.

One embodiment provides that a modification module 130 operates on the set of refined points 118 in order to modify the refined points in a manner that enables the generation of a better representation of the stroke as originally represented by source points 108. In one embodiment, the modification module 130 modifies the coordinates of one or more refined points 118 so that a set of modified and refined points 128 (XRMi, YRMi) results. A method for implementing a modification process for use with an embodiment of the invention is provided with FIG. 5.

Figure 4A:
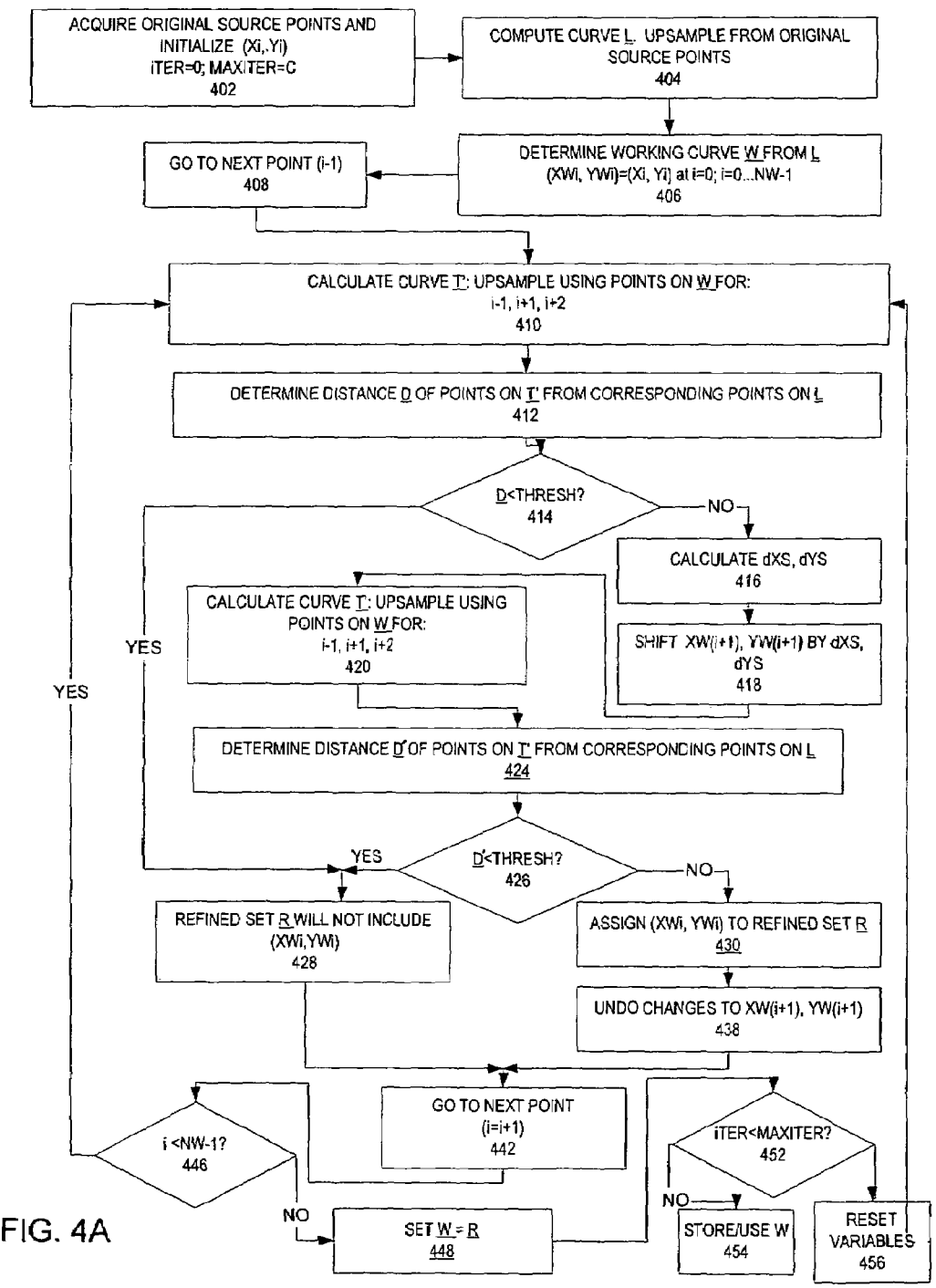
FIG. 4A illustrates a method for refining source points as part of an encoding process, under an embodiment of the invention.

According to an embodiment, the encoder 110 implements one or more upsampling processes in producing the encoded source points (refined and modified data 128, XRMi, YRMi). In one embodiment, a first upsampling process 132 is performed as part of the refinement module 120. In general, any upsampling process takes a set of points that form a curve as input, and then generates additional points to improve that curve. The first upsampling process 132 is performed in order to identify points from the set of source points 108 that can be removed without causing degradation in the system's ability to subsequently decode and recreate the stroke as represented by the source points 108. A method such as described by FIG. 4A illustrates how upsampling can be performed on a portion of an overall set of refined points in order to determine the feasibility of removing any one particular point.

In addition, a second upsampling process 134 may be performed as part of the modification module 130. The second upsampling process 134 is used to determine where refined source points can be shifted to in order to yield a better reproduction of the curve formed by the original source points. The second upsampling process 134 may be based on the same or different algorithm than the first upsampling process 132. In one embodiment, the second upsampling process 134 is different in that it is performed on all points in the set that is being modified, rather than on just some points proximate to a point being considered for removal.

The position of modified and refined points 128 may be statistically encoded and stored as a file 150 in a temporary of permanent memory medium. The decoder 160 can access the file to implement a decoding process based on modified and refined points 128 stored in file 150. As illustrated with FIGS. 7A-7E, the set of modified and refined points 128 can be decoded to yield rendered data 162. The rendered data 162 corresponds to a better representation of the stroke as originally represented by source points 108.

While an embodiment shown by FIG. 1 illustrates the use of both the refinement module 120 and the modification module 130, it should be noted that other embodiments may use just one or the other module. For example, the refinement module 120 may be used without the modification module 130. Additionally, there are numerous ways in which either one or both of the refinement module 120 and the modification module 130 can accomplish the stated objectives without upsampling.

Hardware Diagram

Figure 2:
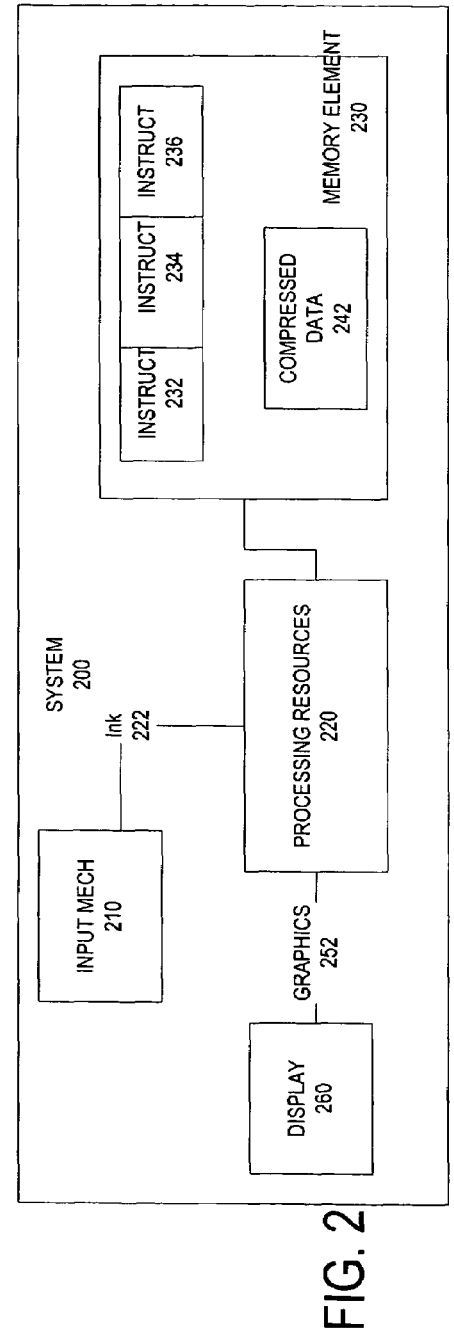
FIG. 2 illustrates a hardware diagram for use with an embodiment of the invention.

FIG. 2 illustrates a hardware diagram for use with an embodiment of the invention. A system 200 may form a portion of an overall computing system, assembly or device, such as a personal computer, laptop, personal digital assistant or smart phone. Components of system 200 include an ink input mechanism 210, processing resources 220, and one or more memory elements 230. The ink mechanism 210 may be operated by a user to generate ink data 222. The processing resource 220 may perform various operations and functions on the ink data 222, including performing operations for encoding (including for performing processes of one or both of the refinement module 120 and the modification module 130) and decoding the ink data 222.

The memory elements 230 may store instructions 232, 234, 236, including instructions that when executed yield programs corresponding to one or all of the refinement module 120, the modification module 130 and the decoder 160. According to one or more embodiments of the invention, these instructions may be used to perform methods such as described in FIGS. 4A, 5 and 6. Compressed data 242 resulting from the encoding process may also be stored in the memory element 230. The processor may access the compressed data 242 to produce ink graphics 252 at a subsequent time. The ink graphics 252 may be produced on a display component 260.

Encoding Process

Figure 3:
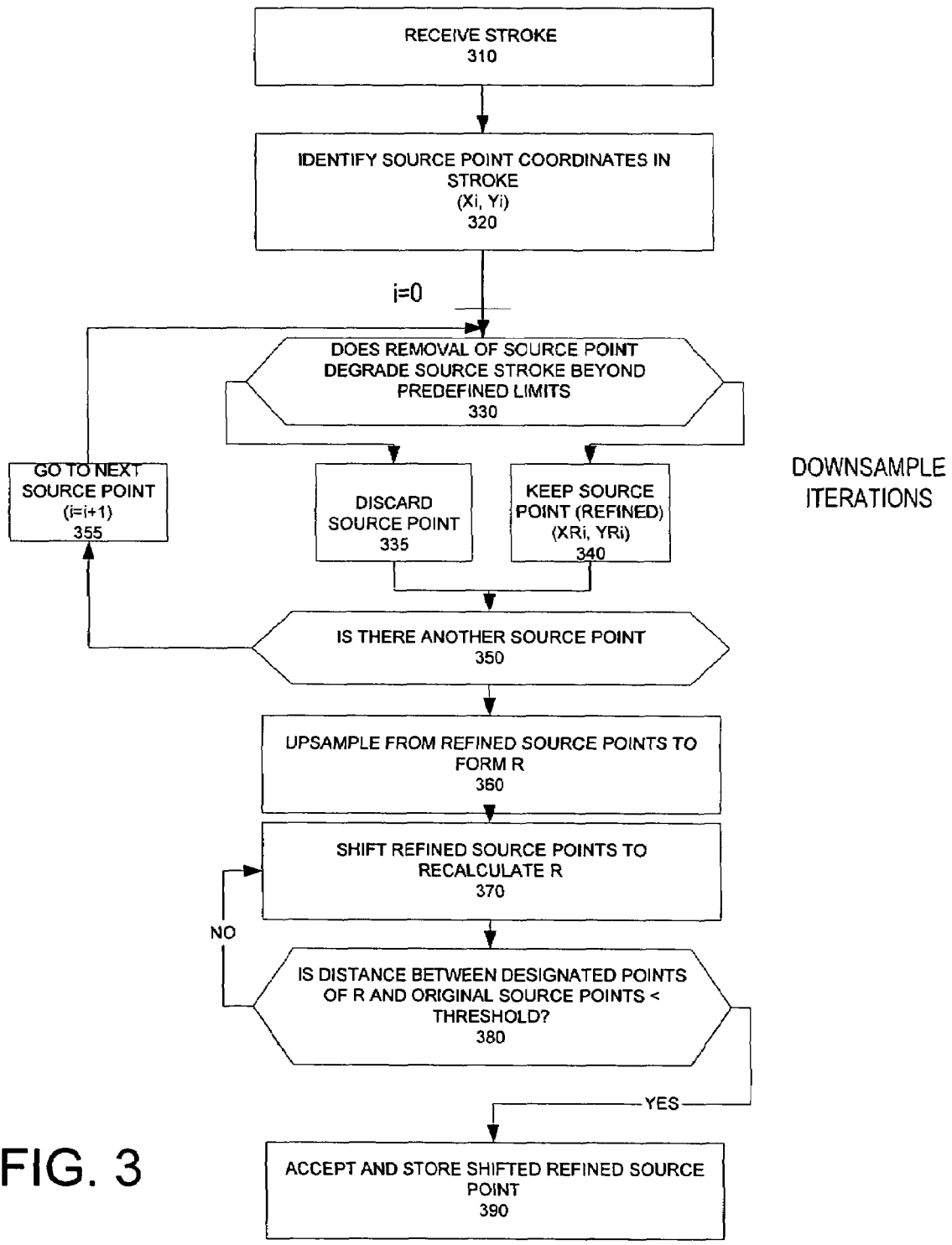
FIG. 3 illustrates an encoding process, according to an embodiment of the invention.

FIG. 3 illustrates an encoding process, according to an embodiment of the invention. A method as described may be performed using elements described in, for example, FIGS. 1 and 2.

Step 310 provides that a stroke is received. From the stroke, step 320 identifies source point coordinates ($X_i, Y_i$). Initially, the iterative variable (i) is set to zero, In step 330, a determination is made as to whether the removal of a particular source point (based on the iteration count) degrades beyond a designated limit the ability to recreate the curve that can be provided from the original source points ($X_i, Y_i$). The limit of the degradation may be one of a design choice. In one embodiment, the determination made in step 330 corresponds to a determination of in the linearity of a portion of a curve formed between successively sampled coordinates. If, for example, three points are located on a substantially straight line then possibly the middle point can be omitted from the set of points that form the final representation of the original source points. The determination made in step 330 may also correspond to a measurement of sample speed versus pointer velocity. The slower the pointer moves, the fewer points are desirable to determine the curve. The measurement of sample speed versus pointer velocity may also be made as a comparison to a design parameter.

If the determination in step 330 is that removal of the source point in question at the particular iteration count does not degrade the ability to decode, then step 335 provides that the point is discarded. Else, step 340 provides that the source point is kept as a refined point ($XR_i, YR_i$).

In 350, a determination is made as to whether the next to last sampled point has been reached, since maintaining end points yield more reliable results. If additional sampled points remain, step 355 iterates to the next sampled point.

Figure 5:
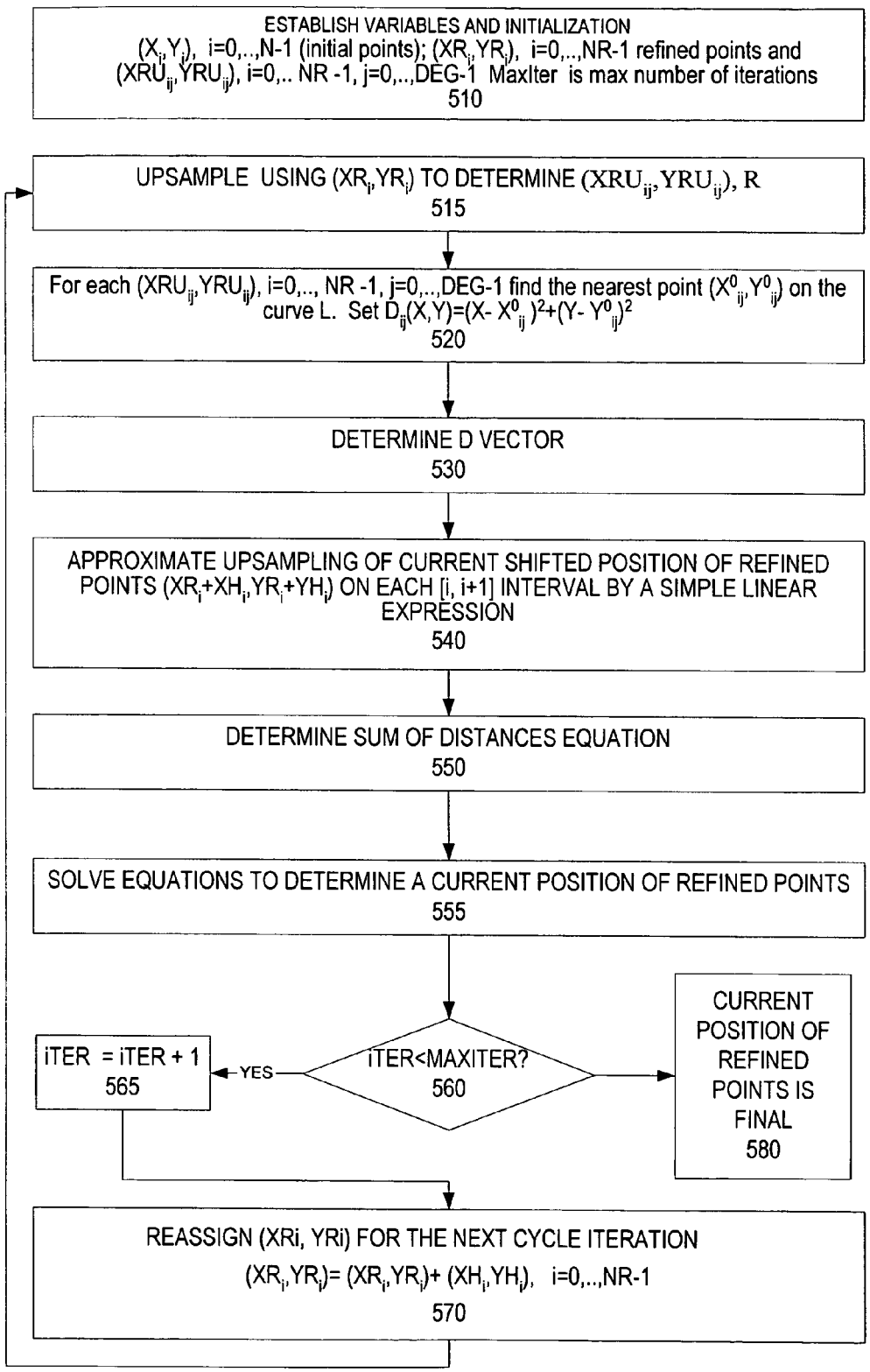
FIG. 5 illustrates a method for modifying source points as part of an encoding process, under an embodiment of the invention.

Otherwise, once the sampling is complete, step 360 provides that the refined source points are upsampled to form a curve R. In step 370, one or more of the refined source points are shifted. An algorithm such as shown in FIG. 5 may be used to perform the shift.

In step 380, a determination is made as to whether a distance between designated points of R and the original source points are less than a threshold. If the determination is negative, additional shifting is needed, and the method proceeds to step 370. Else, step 390 provides that shifted and refined source points are accepted.

Refining Methodology

FIG. 4A illustrates a method for refining source points as part of an encoding process, under one embodiment. The refinement of the source points is a compression procedure, resulting in fewer source points being maintained and stored for purpose of recreating a stroke. In describing a method of FIG. 4A, reference is made to FIGS. 4B, 4C and 4D, which provide illustrations of how a method as described may be implemented.

Figure 4B:
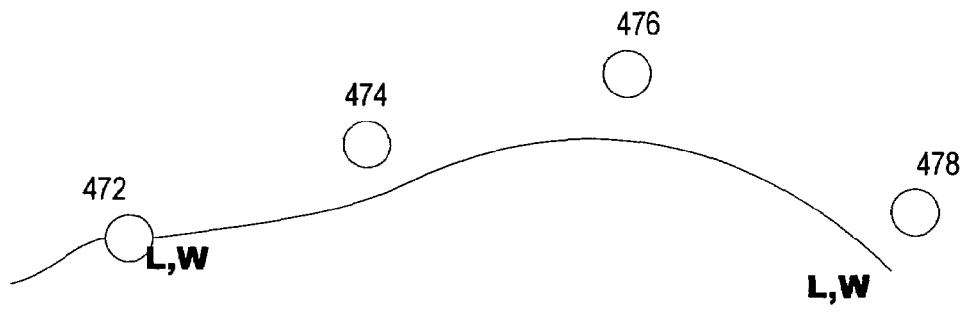
FIGS. 4B-4D illustrate a series of curves formed as part of a method described with FIG. 4 for analyzing and refining sampled points of a stroke, under an embodiment of the invention.
Figure 4C:
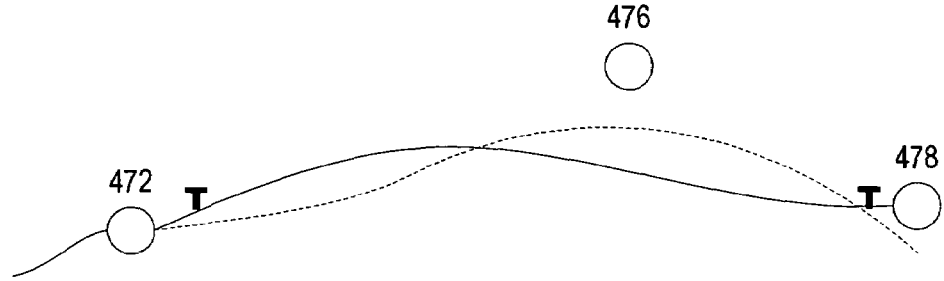

In step 402, original source points are acquired, and initial variables for performing the method are determined or set. The original source points correspond to the points identified from sampling the user's original stroke, entered through a mechanism such as a mouse or pen. In FIG. 4B, points 472-478 correspond to original source points, as determined from sampling a stroke 470. The actually trajectory of stroke 470 is unknown, as only the source points 472-478 can be determined from sampling the stroke mechanism when the stroke is entered. In addition to sampling the stroke 470 for source points 472-478, other variables and set values are determined, including the number of source points sampled from the stroke 470 (N), and the number of cycle iterations that are to be performed (MAXITER). The variable iTER counts the number of times the method of FIG. 4A is cycled through. The maximum number of cycle iterations (MAXITER) sets a limit to the number of refinements that can be made successively with performance of the method.

Step 404 provides that the curve L is determined by upsampling the source points. The upsampling may be performed through any known technique, including one described with a method of FIG. 6.

In step 406, a working curve W is determined from L. In one implementation, W is a copy of L prior to the start of iteration. The curve W is one that is manipulated and analyzed in order to determine whether a particular source point can be removed as part of the refinement process. W and L have common initial points, meaning:

$$X_i, Y_i = XW_i, YW_i \text{ at } i=0; (XW_i, YW_i) = (X_i, Y_i) \text{ at } i=0; \\ i=0 \ldots NW-1 \text{ (see point 472 in FIGS. 4B-4D)} \quad (1)$$

where $X_i, Y_i$ are points on curve L, and $XW_i, YW_i$ are points on curve W.

Step 408 starts a refinement process at the first iteration from the initial point.

In step 410, curve T is calculated by upsampling the following points on ($XW_{i-1}, YW_{i-1}$), ($XW_{i+1}, YW_{i+1}$), and ($XW_{i+2}, YW_{i+2}$). The point ($XW_i, YW_i$) is not included in the upsampling for T at this step. In the example provided by FIG. 4C, curve T is upsampled without point 474, and this removal results in curve T being modified in comparison to curve L.

In step 412, a determination is made as to whether a refinement process results in curve T having a significant difference from curve L. The manner in which a difference (D) between T and L is determined is one of design choice. For example, the distance (D) may be measured by a single point on both L and T, or by multiple points. The distance (D) may be averaged, aggregated or subjected to other formulas and processes in determining an overall difference between T and L.

In step 414, if the distance (D) is less than some threshold value, the method proceeds to step 428. Otherwise, a second test is performed to determine whether the particular point should be kept as a point in the refined set, or discarded.

Figure 4D:
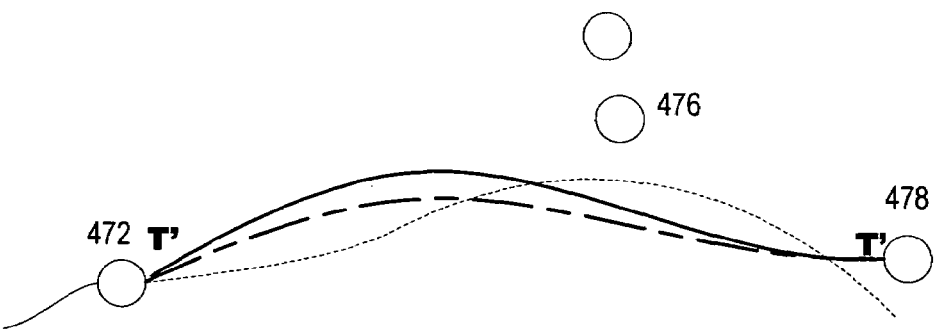

Steps 416-420 determine whether shifting the position of the next point of W in the iteration (e.g. i+1), without iterating from the present point, will yield a sufficiently insignificant difference as to permit removal of that point. In step 416, shift values (dXS, dYS) are calculated for the point on T at (i+1). In one implementation, (dXS, dYS) is calculated by finding the point(s) on L between the points at (i−1) and (i+1), and then finding the nearest point on T. Then (dXS, dYS) may be defined as a simple average connecting these points on L and their nearest points on T. In step 418, the point on W at (i+1) is shifted by (dXS, dYS). At step 420, a new curve T' is calculated by upsampling points on W for (i−1), (i+1) and (i+2). FIG. 4D illustrates a point 482 on T corresponding to the (i+1) iteration, its shifted point 484, and the formation of curve T', based on the shifted point 484 and the omission of point 474 (ith) from T.

Step 424 provides that the distance D' between T' and L is determined. The distance D' may be determined in the same manner as the distance D between T and L.

In step 426, a determination is made as to whether D' is less than a designated threshold. This step may be performed similar to step 414, with the same or different threshold.

If the determination in either step 414 or step 426 is positive, then a decision that a set of refined points R will not include the (ith) point of W is implemented. The effect is that the set of refined points R will not include a point that was part of the original sampled set.

If the determination in step 426 is negative, the (ith) point of W is a candidate for the set of R. This means that removal of that point will cause a degradation in the curve that can be generated from the original L. Step 430 then provides that the (ith) point (XWi, YWi) is assigned to refined set R. Then in step 432, the changes made to the (i+1) point are undone, so that the method can iterate.

Following either step 428 or 430, step 442 provides that an iteration of points on the curve W takes place. The next iteration of a point on the curve W yields all new curves T and T'. The iterations are continued until the (i+1) point corresponds to the endpoint of W, or, in other words, whether the iteration is <NW. Accordingly, in step 446, this iteration limit is checked. If additional points remain on W that are not either discarded or refined, the method returns to step 410, there the curve T is calculated using the next point on W. Otherwise, step 448 provides that the points that comprise W are set to equal to the points that comprise the set of refined points R. W may also be upsampled using the points of R.

Following step 448, a determination is made as to whether a method for refining points as described can be cycled through again, this time with the refinement occurring on an already refined curve W. The cycle iteration variable iTER is checked in step 452. If other iterations are possible, step 456 provides that the iteration variables (i, NW) are reset. The method proceeds to step 410, where T is determined from W (and W is now determined from R, not L).

A method as described may be cycled through several times, where in each cycle, the set of points that comprise W are set to an increasingly smaller number of points in R. Once the maximum number of iterations is reached, step 454 provides that the current set of W is stored or used. This set of W contains refined points from the original set of points in L.

Modifying Methodology

A refinement process forms just one part of an encoding algorithm, under an embodiment. FIG. 5 illustrates a method in which refined points may be modified in position so that a subsequent decoding provides a better output.

Step 510 establishes variables that are to be used in this stage, including the set of source points $(X_i, Y_i)$, $i=0, \ldots, N-1$, and the set of "refined" points $(XR_i, YR_i)$, $i=0, \ldots, NR-1$, where $(XR_i, YR_i)$ obtained on the first stage, and NR represents the total number of points on the curve R. Since R represents a downsampling from L, the value of NR is less than N. An upsampled representation of source points $(XU_{ij}, YU_{ij})$, $i=0, \ldots N-1, j=0, \ldots, DEG-1$ is also already computed (curve L), where DEG represents the number of equal subdivisions between source points. As described below, subdivisions are used to determine the upsampling. Lastly, an iteration limit (MAXITER) may be set, with an iteration counter (ITER) initialized at 0.

In step 515, a curve R is determined by upsampling (XRi, YRi). An upsampled representation of refined points $(XRU_{ij}, YRU_{ij})$, in R is assumed to be a representation of $(XU_{ij}, YU_{ij})$ for L. With each cycle iteration, this representation should improve.

One result or goal of a method as described in FIG. 5 is to determine a set of such shift values $(XH_i, YH_i)$, $i=0, \ldots, NR-1$, so that a set of shifted refined points=$(XR_{i-1}+XH_{i-1}, YR_{i-1}+YH_{i-1})$ satisfy the following:

$$(XRMi, YRMi) = (XR_{i-1}+XH_{i-1}, YR_{i-1}+YH_{i-1}) \quad (2)$$

If the above condition is satisfied, an upsampling of shifted points results in a good approximation of $(XRU_{ij}, YRU_{ij})$ and R.

To this end, step 520 provides that for each $(XRU_{ij}, YRU_{ij})$, $i=0, \ldots, NR-1, j=0, \ldots, DEG-1$, the nearest point $(X^0_{ij}, Y^0_{ij})$ on the curve L is determined.

Then step 530 provides for a distance D vector determination:

$$D_{ij}(X, Y) = (X-X^0_{ij})^2 + (Y-Y^0_{ij})^2 \quad (3)$$

The upsampling of current shifted position of refined points $(XR_i+XH_i, YR_i+YH_i)$, is approximated on each [i, i+1] interval by a simple linear expression in step 540. In one embodiment, the linear expression used corresponds to:

$$\alpha_{ij}(XR_{i-1}+XH_{i-1}, YR_{i-1}+YH_{i-1}) + \beta_{ij}(XR_i+XH_i, YR_i+YH_i) + \gamma_{ij}(XR_{i+1}+XH_{i+1}, YR_{i+1}+YH_{i+1}), \quad (4)$$

where $(\alpha_{ij}, \beta_{ij}, \gamma_{ij})$, $i=0 \ldots NR-1$, $j=0 \ldots DEG-1$ are predefined constants, specific for a given upsampling method. In one implementation, the values for 4-step upsampling algorithm are as follows:

$$(\alpha_{i0}, \beta_{i0}, \gamma_{i0}) = (3/4, 3/16, 1/16), \quad (5a)$$

$$(\alpha_{i1}, \beta_{i1}, \gamma_{i1}) = (9/16, 17/64, 11/64), \quad (5b)$$

$$(\alpha_{i2}, \beta_{i2}, \gamma_{i2}) = (27/64, 67/256, 81/256), \quad (5c)$$

$$(\alpha_{i3}, \beta_{i3}, \gamma_{i3}) = (81/256, 201/1024, 499/1024), \quad (5d)$$

for all $i=0 \ldots NR-1$. Calculate the sum of squares of distance from upsampling of shifted points to L.

$$S = S(XH_1, YH_1, \ldots XH_{NR-1}, YH_{NR-1}) = \\ \Sigma_{i=0, \ldots, NR-1, j=0, \ldots, DEG-1} D_{ij}(\alpha_{ij}(XR_{i-1}+XH_{i-1}) + \beta_{ij}(XR_i+XH_i) + \gamma_{ij}(XR_{i+1}+XH_{i+1}), \alpha_{ij}(YR_{i-1}+YH_{i-1}) + \beta_{ij}(YR_i+YH_i) + \gamma_{ij}(YR_{i+1}+YH_{i+1}) \quad (6)$$

To find the best set of shifts $(XH_i, YH_i)$, step 550 provides that the sum of distances between these parts and the corresponding parts of the curve L are minimized. This sum may be expressed as a quadratic function of variables $(XH_i, YH_i)$ that can be differentiated. For minimization of function $S(XH_1, YH_1, \ldots XH_{NR-1}, YH_{NR-1})$ solve the system of equations:

$$\partial S(XH_i, YH_i)/\partial XH_i = 0, \partial S(XH_i, YH_i)/\partial YH_i = 0, i=0, \ldots, NR-1 \quad (7)$$

After differentiation occurs, the result is a set of 2*NR linear equations for unknown $XH_i, YH_i, i=0 \ldots NR-1$.

A determination of the solution of this system in step 555 (3-diagonal system of linear equations) provides an update the current position of the refined points.

In step 560, a determination is made as to whether more cycle iterations are needed or permissible. This step may be performed by comparing the iteration counter (iTER) to the designated number of maximum iterations (MAXITER). If there are to be more iterations, step 565 iterates the cycle iteration variable (iTER).

Step 570 reassigns (XRi, YRi) for the next cycle iteration:

$$(XR_i, YR_i) = (XR_i, YR_i) + (XH_i, YH_i), i=0, \ldots, NR-1. \quad (8)$$

The method then returns to step 515, where $(XRU_{ij}, YRU_{ij})$ are redetermined with the shifts.

If the determination in step 560 is that no more iterations can be performed, then the solution of step 550 is deemed final in step 580:

$$(XRMi, YRMi) = (XR_i, YR_i), i=0 \ldots NR-1 \quad (9)$$

The method then ends, at which point the source points are said to be refined (desampled) and modified (shifted). Fewer source points are stored, but these source points are shifted so that when decoding is performed, the upsampled curve provided by these points is a very good representation of the original curve. It should be noted that while an embodiment described with FIG. 5 illustrates modification of refined points as determined from a method of FIG. 4, the modifications of the method may be made to source points without refinement, or to source points that are refined or modified through other processes.

Upsampling Process

Figure 6:
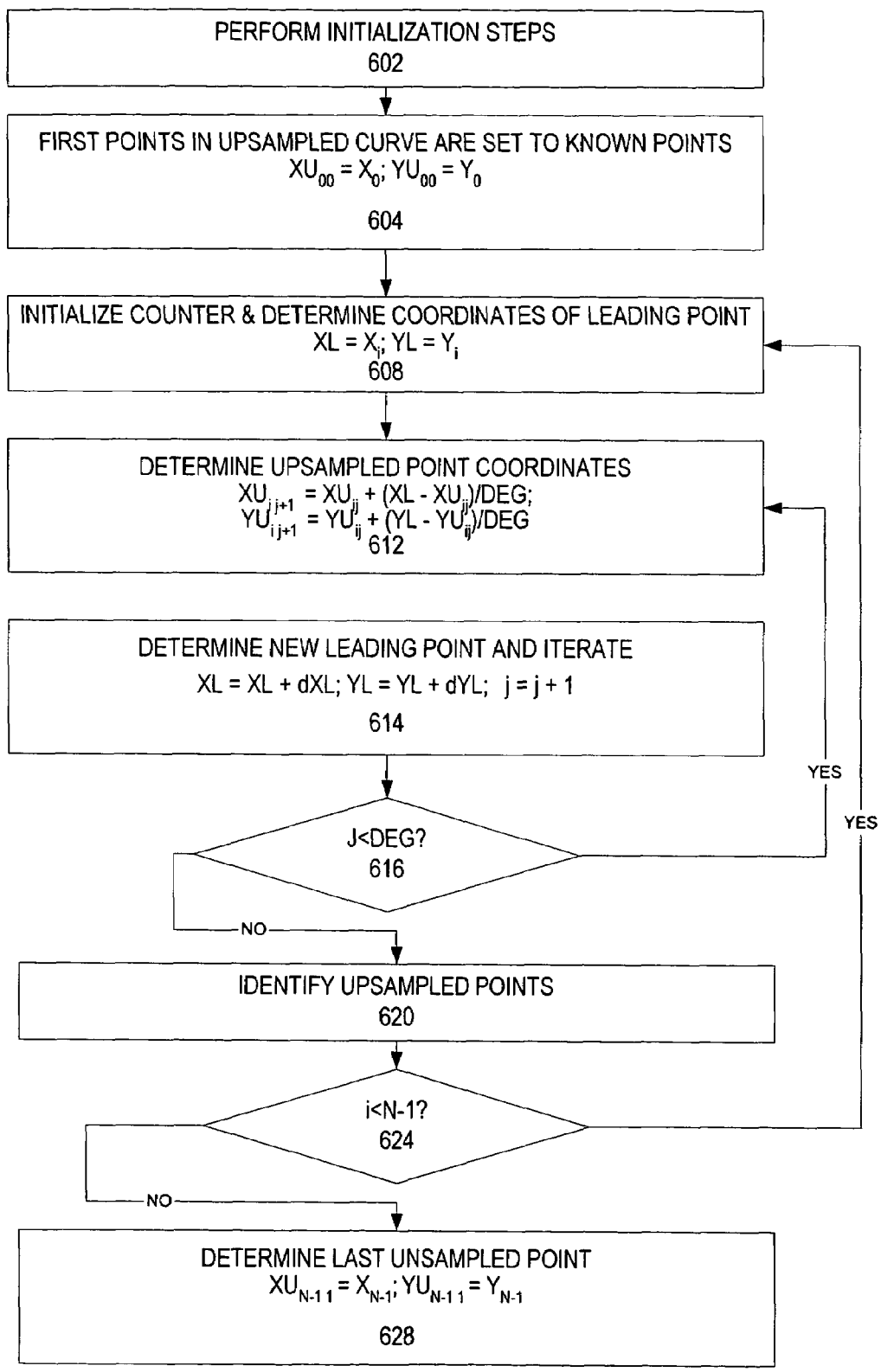
FIG. 6 illustrates a method for decoding encoded points, under an embodiment of the invention.

Numerous upsampling processes are known in the art and can be implemented with one or more encoding processes described herein. In one embodiment, a upsampling process may be implemented from a class of "pursuit" algorithms, such as shown in FIG. 6. In an embodiment, upsampling algorithm may be performed on sampled points that have been modified and refined (XRMi, YRMi) according to one or more embodiments described above.

Step 602 provides that initialization steps are performed. This may include setting (i) the first upsampled point to be the first source point, (ii) the index of current upsampled point to 0, and (iii) the index of the "current" input point to 2.

As with other algorithms described, a method such as described iteratively cycles through all input points. For each input point with index j, an internal "pursuit" cycle is performed (602-604). The number of "pursuit" steps corresponds to a predefined constant (DEG), set to 4 in the example provided. On the initialisation stage 602 the cycle counter (j) is set as 0; the coordinates of leading point (XL, YL) are set equal to the coordinates of current input point; the increments dXL, dYL for leading point coordinates are computed being as one DEG'th part of the shift between (i+1)'th and i'th input point coordinates. One general principle of a method as described is that on each "pursuit" step, a new upsampled point with coordinates $(XU_{i,j+1}, YU_{i,j+1})$ is generated by shifting the position of current upsampled point in the direction of "leading" point, the size of this shift being one DEG'th part of distance between current upsampled point and leading point.

In step 604, initialization takes place where the first points in the upsampled curve are set to the known points (which in this case are modified and refined points derived from source points of previously described methods). The representation of the initialization is:

$$XU_{00} = X_0; YU_{00} = Y_0 \text{ (first point in upsampled representation); } i=0 \text{ (index of input point)} \quad (10)$$

In step 608, an iteration counter representing the number of pursuit steps is initialized. In addition, the coordinates of a leading point are determined:

$$XL = X_i; YL = Y_i \text{ (coordinates of a "leading" point)} \quad (11)$$

The "hop" between adjacent upsampled points may be determined as follows:

$$dXL = (X_{i+1} - X_i)/DEG; dYL = (Y_{i+1} - Y_i)/DEG \quad (12)$$

In step 612, upsampled point coordinates are determined:

$$XU_{i,j+1} = XU_{ij} + (XL - XU_{ij})/DEG; \quad (13)$$

$$YU_{i,j+1} = YU_{ij} + (YL - YU_{ij})/DEG \quad (14)$$

Additionally, step 614 provides that new leading point is identified, and an iteration is performed to hop to the next adjacent upsampled point:

$$XL = XL + dXL; YL = YL + dYL; \quad (15)$$

$$j = j+1 \quad (16)$$

A determination is made in step 616 as to whether the counter is less than DEG (the number of pursuit steps between the stored points (XRMi, YRMi)). If additional iterations remain, the method returns to step 612.

Else upsampled points are identified in step 620:

$$XU_{i+1,0} = XU_{i,DEG}, YU_{i+1,0} = YU_{i,DEG}, i=i+1 \quad (17)$$

In step 624, a determination is made as to whether additional points remain for unsampling. The iteration counter (i) may be used to perform this step:

$$i < N-1 \quad (19)$$

If additional points remain, the method returns to step 608, where steps 608-620 are repeated for a new pair of points.

Else, the method is complete in step 628, and the last upsampled point is determined:

$$XU_{N-1,1} = X_{N-1}; YU_{N-1,1} = Y_{N-1} \text{ (Last upsampled point)} \quad (18)$$

At this point, the last upsampled point is generated with coordinates being equal to the coordinates of the last input point. The total number of upsampled points is DEG*(N−1)+2.

EXAMPLES

Figure 7A:
FIGS. 7A-7E illustrate examples of how one or more embodiments of the invention can be implemented and compared to past approaches, under an embodiment of the invention.

FIGS. 7A-7E provide examples of how one or more embodiments of the invention may be implemented. FIG. 7A illustrates the source curve representation in sampling points of an input device for generating electronic ink. An example of such a device is a WACOM tablet, with 120 Hz sampling rate.

Figure 7B:

FIG. 7B illustrates a result of a refinement process as described with other embodiments, in which the source curve is downsampled. The points remaining after downsampling are rendered with the bold line. This rendering is superimposed over the source points rendering (thin line). The number of points is reduced almost threefold.

Figure 7C:
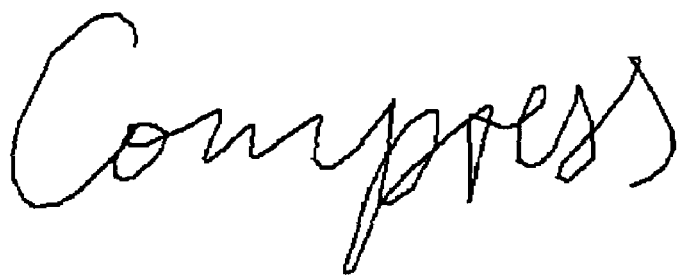

FIG. 7C illustrates the inadequacy of the downsampled representation of the source curve: after rendering the downsampled representation, a curve is obtained that has many artifacts. This curve is visually degraded. If this representations would be just compressed statistically (the second stage of compression), then the decompressed curve will have exactly this representation, with accordingly bad rendering.

Figure 7D:

FIG. 7D illustrates application of the upsampling algorithm to the downsampled (non-modified) representation. The curve rendered this way is smooth (bold line), but it deviates a lot from the source curve (thin line).

Figure 7E:

FIG. 7E illustrates the application of both steps of compression algorithm: downsampling and modification. The application of both algorithms results in a smoothed curve with no artifacts (bold line), but the one very close to the source curve (thin line). Since both the second stage of compression and decompression too do not introduce any additional deviations in the curve, the summary results of compression/decompression process can be seen.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for handling electronic ink, the method comprising:
    identifying a set of source points that represent a stroke input of a user;
    refining the set of source points wherein the refining comprises:
        determining a representation of the stroke input when one or more of the source points are removed from the set of source points;
        comparing a representation of the stroke input with the one or more of the source points removed from the set to a representation of the stroke input with the one or more of the source points included in the set; and
        removing the one or more of the source points from the set of source points based on the comparison;
    storing the set of source points without the one or more of the source points for subsequent use in decoding the set of the source points;
    wherein the determining the representation includes upsampling at least a portion of a curve formed by at least some of the source points in the set.

2. The method of claim 1, further comprising modifying a position of one or more points in the set of source points.

3. The method of claim 1, further comprising:
    modifying a position of one or more points in the set of source points; and
    wherein the storing the set of source points includes storing one or more source points that have the changed coordinates.

4. The method of claim 2, wherein the modifying a position of one or more points in the set of source points is performed after removing the one or more of the source points from the set of source points.

5. The method of claim 2, wherein modifying a position of one or more points in the set of source points includes implementing an upsampling process in order to determine a change to the position.

6. A system for handling electronic ink, the system comprising:
    an interface for an input device to receive a stroke input;
    an encoder, coupled to the interface, to:
        initiate sampling of the input device to determine a set of original source points that represent a stroke entered by a user using the input device;
        from the set of original source points, determine a modified set of source points that (i) has a population that is smaller than the determined set of original source points, and (ii) has one or more points that have a different position than the set of original source points;
        transfer the modified set of source points to one or more memory elements.

7. The system of claim 6, further comprising one or more memory elements that store the modified set of source points.

8. The system of claim 6, wherein the encoder is further to derive from each point in the modified set of source points a corresponding point in the set of original source points, and wherein a position of each point in at least a majority of the modified set of source points is different than a position of the corresponding point in the set of original source points.

9. The system of claim 6, wherein the encoder is further to generate a stroke representation based on the modified set of source points.

10. The system of claim 6, wherein the encoder is further to execute one or more upsampling processes in order to determine the population of the modified set of source points.

11. The system of claim 10, wherein the encoder is further to determine the modified set of source points by evaluating individual points in the set of original source points using a corresponding upsampling process.

12. The system of claim 11, wherein the encoder is further to evaluate a rate of change of individual points in the set of original source points using the corresponding upsampling process.

13. The system of claim 11, wherein the encoder is further to evaluate a curve formed by individual points in the set of original source points using the corresponding upsampling process.

14. The system of claim 6, wherein the encoder is further to execute one or more upsampling processes in order to determine a position of each point in the modified set of source points.

15. The system of claim 14, wherein the encoder is further to shift a position of at least one source point in the set of original source points in deriving the modified set of source points.

16. The system of claim 11, wherein the encoder is further to eliminate at least one source point in the set of original source points in using a remainder of the set of original source points as points in the modified set of source points.

17. The system of claim 16, wherein the encoder is further to shift a position of at least one source point in the remainder of the set of original source points in deriving the modified set of source points.

18. A method for handling electronic ink, the method comprising:

identifying a set of source points that represent a stroke input of a user;

generating a set of modified source points derived from a corresponding point in the set of source points, wherein at least one of the points in the set of modified source points has a new position that is shifted from a position of the corresponding point in the set of source points, and the new position is determined using an upsampling of the set of source points; and storing the set of modified source points for subsequent use in decoding the set of source points.

19. The method of claim 18, wherein the generating a set of modified source points includes upsampling at least a portion of a curve formed by at least some of the points in the set of source points.

20. The method of claim 19, further comprising the refining the set of source points by removing one or more points in the set of source points, and wherein the generating the set of modified source points includes modifying the set of source points after refining the set of source points.

21. The method of claim 20, wherein the refining the set of source points includes upsampling at least a portion of a curve formed by at least some of the points in the set of source points.

22. A computer-readable storage medium, containing computer instructions thereon which, when executed by a computer system, cause the computer system to perform a method for handling electronic ink, the method comprising:

identifying a set of source points that represent a stroke input of a user;

refining the set of source points wherein the refining comprises:

determining a representation of the stroke input when one or more of the source points are removed from the set of source points;

comparing a representation of the stroke input with the one or more of the source points removed from the set to a representation of the stroke input with the one or more of the source points included in the set; and removing the one or more of the source points from the set of source points based on the comparison;

storing the set of source points without the one or more of the source points for subsequent use in decoding the set of the source points;

wherein the determining the representation includes upsampling at least a portion of a curve formed by at least some of the source points in the set.

23. A computer-readable storage medium, containing computer instructions thereon which, when executed by a computer system, cause the computer system to perform a method for handling electronic ink, the method comprising:

identifying a set of source points that represent a stroke input of a user;

generating a set of modified source points derived from a corresponding point in the set of source points, wherein at least one of the points in the set of modified source points has a new position that is shifted from a position of the corresponding point in the set of source points, and the new position is determined using an upsampling of the set of source points; and storing the set of modified source points for subsequent use in decoding the set of source points.

24. A system for handling electronic ink, the system comprising:

an interface for an input device to receive a stroke input;

an encoder, coupled to the interface, to:

identify a set of source points that represent a stroke input of a user;

generate a set of modified source points derived from a corresponding point in the set of source points, wherein at least one of the points in the set of modified source points has a new position that is shifted from a position of the corresponding point in the set of source points, and the new position is determined using an upsampling of the set of source points; and store the set of modified source points for subsequent use in decoding the set of source points.

* * * * *